(12) United States Patent  (10) Patent No.: US 9,154,832 B2
Valdez et al.  (45) Date of Patent: Oct. 6, 2015

(54) TESTING FRAME COLOR COUNTING TECHNIQUE

(75) Inventors: Jason Valdez, Westminster, CO (US); Wayne Kunze, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 620 days.

(21) Appl. No.: 13/538,497

(22) Filed: Jun. 29, 2012

(65) Prior Publication Data

US 2013/0259139 A1    Oct. 3, 2013

Related U.S. Application Data

(60) Provisional application No. 61/617,354, filed on Mar. 29, 2012.

(51) Int. Cl.
G06K 9/18 (2006.01)
H04N 7/26 (2006.01)
H04N 21/44 (2011.01)
G06K 9/00 (2006.01)

(52) U.S. Cl.
CPC ...... H04N 21/44008 (2013.01); G06K 9/00744 (2013.01)

(58) Field of Classification Search
None
See application file for complete search history.

(56) References Cited

U.S. PATENT DOCUMENTS

| | | | |
|---|---|---|---|
| 5,214,508 A | 5/1993 | Stevens | |
| 5,771,075 A | 6/1998 | Rim et al. | |
| 5,892,843 A | 4/1999 | Zhou et al. | |
| 6,012,109 A | 1/2000 | Schultz | |
| 6,281,929 B1 | 8/2001 | Fimoff | |
| 6,944,228 B1 | 9/2005 | Dakss et al. | |
| 7,957,561 B2 | 6/2011 | Joung et al. | |
| 8,570,379 B1 | 10/2013 | Valdez et al. | |
| 8,848,062 B2 | 9/2014 | Valdez et al. | |
| 2001/0117892 | 8/2001 | Barton et al. | |
| 2002/0021805 A1 | 2/2002 | Schumann et al. | |
| 2002/0149787 A1* | 10/2002 | Thieret | 358/1.9 |
| 2003/0177503 A1* | 9/2003 | Sull et al. | 725/112 |
| 2008/0001950 A1* | 1/2008 | Lin et al. | 345/473 |
| 2008/0137968 A1* | 6/2008 | Joung et al. | 382/218 |

(Continued)

FOREIGN PATENT DOCUMENTS

CA    2767597        8/2012
EP    2490446 A1     8/2012

(Continued)

OTHER PUBLICATIONS

International Preliminary Report on Patentability for PCT/US2013/033659 mailed Oct. 9, 2014, 9 pages.

(Continued)

*Primary Examiner* — Christopher S Kelley
*Assistant Examiner* — Kaitlin A Retallick
(74) *Attorney, Agent, or Firm* — Kilpatrick Townsend & Stockton LLP

(57) ABSTRACT

Various arrangements for determining a frame number of a video frame are presented. A decoded video frame may include a test image and a numerical color pattern. A first color present within the color pattern of the video frame at a first predefined location may be identified. A second color present within the color pattern of the video frame at a second predefined location may be identified. The frame number of the video frame may be identified using at least the first color and the second color.

18 Claims, 9 Drawing Sheets

(56) References Cited

U.S. PATENT DOCUMENTS

| | | | |
|---|---|---|---|
| 2008/0172747 A1 | 7/2008 | Hurtado et al. | |
| 2008/0310722 A1* | 12/2008 | Daniels et al. | 382/182 |
| 2009/0128633 A1 | 5/2009 | Chapman | |
| 2009/0248702 A1 | 10/2009 | Schwartz et al. | |
| 2009/0290711 A1 | 11/2009 | Bloom et al. | |
| 2010/0208891 A1 | 8/2010 | Folea et al. | |
| 2010/0232550 A1 | 9/2010 | Lee et al. | |
| 2010/0239226 A1 | 9/2010 | Mountain | |
| 2011/0126018 A1 | 5/2011 | Narsinh et al. | |
| 2011/0311098 A1 | 12/2011 | Kim et al. | |
| 2012/0207342 A1 | 8/2012 | Quail | |
| 2012/0328149 A1 | 12/2012 | Chen et al. | |
| 2013/0301872 A1 | 11/2013 | Flaharty et al. | |
| 2014/0098889 A1 | 4/2014 | Valdez et al. | |
| 2014/0362931 A1 | 12/2014 | Valdez et al. | |

FOREIGN PATENT DOCUMENTS

| | | | |
|---|---|---|---|
| WO | 99/65241 | A1 | 12/1999 |
| WO | 00/51348 | A2 | 8/2000 |
| WO | 2004/029954 | A1 | 4/2004 |
| WO | 2010/041208 | A1 | 4/2010 |
| WO | 2013/148551 | A1 | 10/2013 |
| WO | 2014/055321 | A1 | 4/2014 |

OTHER PUBLICATIONS

International Search Report and Written Opinion of PCT/US2013/061853 mailed Dec. 12, 2013, 11 pages.
U.S. Appl. No. 14/469,730 Non Final Office Action mailed Oct. 20, 2014, 10 pages.
International Search Report and Written Opinion of PCT/US2013/033659 mailed Jun. 10, 2013, 16 pages.
U.S. Appl. No. 14/036,822 Notice of Allowance mailed May 27, 2014, 16 pages.
U.S. Appl. No. 14/036,822 Non Final Rejection mailed Jan. 6, 2014, 11 pages.
U.S Appl. No. 13/371,912 Final Office Action mailed Dec. 24, 2014, 18 pages.
U.S. Appl. No. 13/371,912 Non Final Office Action mailed Jul. 24, 2014, 19 pages.
U.S. Appl. No. 13/371,912 Non Final Office Action mailed Feb. 27, 2014, 23 pages.
U.S. Appl. No. 13/645,053 Notice of Allowance mailed Jul. 9, 2013, 15 pages.
Extended European Search Report for EP 11 15 4580 dated Aug. 22, 2011, 8 pages.
Langelaar, G., et al., "Watermarking Digital Image and Video Data—A State-of-the-Art Overview," IEEE Signal Processing Magazine, Sep. 2000, vol. 17, Issue 5, pp. 20-46.
Author Unknown, "Picture Quality Analysis: Real-Time Measurements for Objective Video Quality," National Instruments, published Jun. 22, 2012, 4 pages. Accessed on May 21, 2015. Retrieved from http://www.ni.com/white-paper/12703/en/.
International Preliminary Report on Patentability for PCT/US2013/061853 mailed Apr. 16, 2015, 6 pages.
U.S. Appl. No. 13/371,912 Non Final Office Action mailed Mar. 26, 2015, 17 pages.
U.S. Appl. No. 14/469,730 Notice of Allowance mailed Apr. 14, 2015, 16 pages.
"Picture Quality Analysis: Real-lime Measurements for Objective Video Quality," published Jun. 22, 2012, 4 pages. Retrieved from National Instruments: www.ni.com.

* cited by examiner

TESTING FRAME COLOR COUNTING TECHNIQUE

CROSS REFERENCES

This application claims priority to co-pending Provisional Application No. 61/617,354, filed Mar. 29, 2012, entitled "Testing Frame Color Counting Technique." This provisional application is hereby incorporated by reference for all purposes.

BACKGROUND

Typically, when a video frame is numbered, some number of characters (e.g., numbers) are visually displayed within the video frame. In system 100 of FIG. 1, a typical arrangement is illustrated: set top box 120 receives an encoded signal from signal source 110. Set top box 120 decodes the encoded signal into a format appropriate to be output to television 130 (or some other form of display device) for display. When the video frame is displayed by the television, the frame number is visible at the same time as the rest of the video frame. For a human viewer, this may provide a relatively simple way to identify the frame number of a particular frame when a video frame is displayed for a sufficient period of time (e.g., a half second or more).

However, if the video frame is output to a computerized device, reading a character-based frame number from the video frame may involve the use of optical character recognition (OCR). OCR may be processor-intensive, especially if frame numbers are to be determined in real time for a significant number of video frames.

SUMMARY

Various arrangements for determining a frame number of a video frame are presented. In some embodiments, a method for determining a frame number of a video frame is presented. The method may include receiving, by a video decoding device, an encoded video frame of a series of video frames. The method may include decoding, by the video decoding device, the encoded video frame of the series of video frames. The method may include outputting, by the video decoding device to a computer system, the decoded video frame of the series of video frames. The decoded video frame may comprise a test image and a color pattern. The computer system may be separate and communicatively coupled with the video decoding device. The method may include identifying, by the computer system, a first color present within the color pattern of the video frame at a first predefined location. The method may include identifying, by the computer system, a second color present within the color pattern of the video frame at a second predefined location. The method may include determining, by the computer system, the frame number of the video frame using at least the first color and the second color.

Embodiments of such a method may include one or more of the following: Each color of the color pattern may correspond to a different number. Optical character recognition may not be used by the computer system to determine the frame number. The method may include selecting, by the computer system, a reference frame that corresponds to the frame number of the decoded video frame, wherein the reference frame comprises the test image. The method may include comparing, by the computer system, the reference frame and the decoded video frame. Colors of the color pattern may be selected from: red, blue, green, and black. The method may include receiving, by the video decoding device, a second encoded video frame. The method may include decoding, by the video decoding device, the second encoded video frame. The second encoded video frame may be part of a wraparound that transitions an end of the series of video frames to the beginning of the series of video frames. The method may include outputting, by the video decoding device to the computer system, the second decoded video frame wherein a second color pattern of the second decoded video frame prevents determination of a valid frame number. The method may include determining, by the computer system, the second video frame is not to be compared to another video frame based on the second color pattern. Each predefined location may correspond to a different region of the color pattern. Each region of the color pattern may comprise multiple pixels of the video frame. Determining, by the computer system, the frame number of the video frame using the first color and the second color may be performed in real time. The method may include receiving, by the computer system, from a user, the first and the second predefined locations.

In some embodiments, a computer program product residing on a non-transitory processor-readable medium for determining a frame number of a video frame is presented. The computer program product may comprise processor-readable instructions configured to cause a processor to identify a first color present within a color pattern of the video frame at a first predefined location. The computer program product may comprise processor-readable instructions configured to cause the processor to identify a second color present within the color pattern of the video frame at a second predefined location. The computer program product may comprise processor-readable instructions configured to cause the processor to determine the frame number of the video frame using at least the first color and the second color.

Embodiments of such a computer program product may include one or more of the following: Each color of the color pattern may correspond to a different number. Optical character recognition may not be used to determine the frame number. The processor-readable instructions may be further configured to cause the processor to select a reference frame that corresponds to the frame number of the video frame. The computer program product may comprise processor-readable instructions configured to cause the processor to compare the reference frame and the decoded video frame. Each predefined location may correspond to a different region of the color pattern. Each region of the color pattern may comprise multiple pixels of the video frame. The processor-readable instructions may be configured to cause the processor to determine the frame number of the video frame using the first color and the second color are executed in real time.

In some embodiments, a method for numbering video frames may be presented. The method may include receiving, by a computer system, a series of video frames. The method may include numbering, by the computer system, each frame of the series of video frames such that each frame is assigned a number. The method may include encoding, by the computer system, the number corresponding to each frame into a color pattern. Each color used for the color pattern may correspond to a numerical value. The method may include modifying, by the computer system, each frame to comprise the color pattern corresponding to the number of the frame. The position of the color pattern may be consistent for each frame of the series of video frames.

Embodiments of such a method may include one or more of the following: The color pattern may be comprised of a series of colored regions, wherein each colored region comprises multiple pixels and each colored region contains only a single color. Modifying, by the computer system, each frame to include the color pattern corresponding to the number of the frame may further include modifying each frame to have a blank region surrounding the color pattern. Colors for the color pattern may be selected from red, blue, green, and black. The series of video frames may be part of a video loop used for testing video equipment. The method may further comprise creating a wraparound from an end of the series of video frames to a beginning of the series of video frames. At least one video frame of the wraparound may be configured to prevent a comparison involving the at least one frame of the wraparound.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
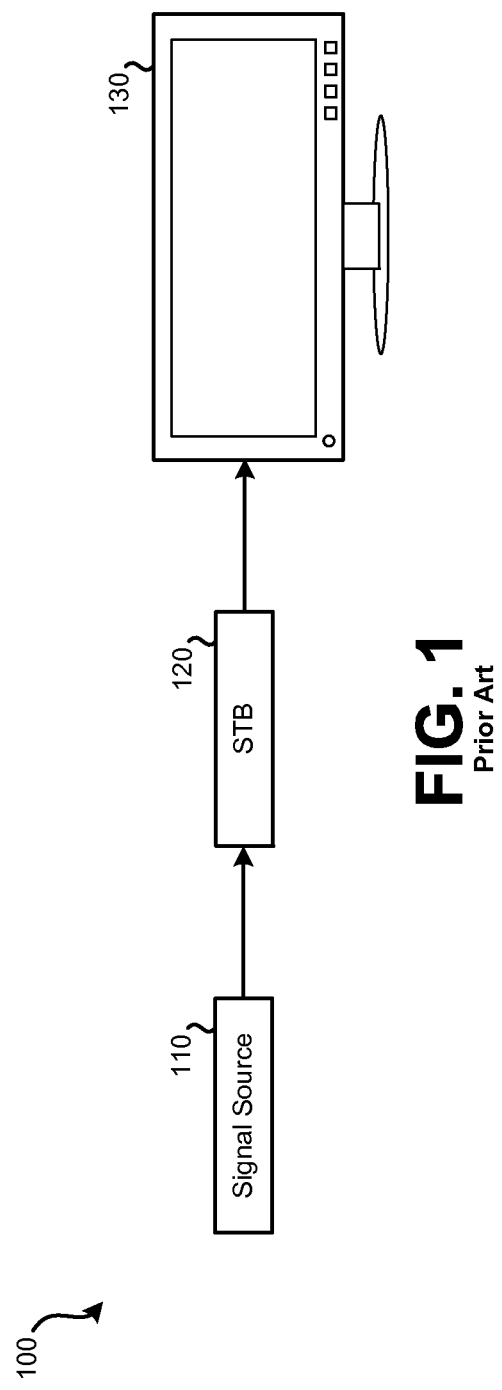
FIG. 1 illustrates an embodiment of a system for decoding an encoded signal by a set top box for display.

Rather than using characters (e.g., numbers) to identify a frame number, a color pattern may be used. Determining a frame number based on the color pattern may be less processor-intensive than based on characters that require an optical character recognition (OCR) process to be performed. If a series of video frames is in sequence, each frame of the series may be modified to contain a color pattern. The color pattern may be positioned in a same (or similar) location within each frame. Each color used in the color pattern may be associated with a numerical value. As such, for each frame, a different color pattern may be present that can be used to determine the frame number of the frame.

Equipment (e.g., a computer system) that receives a frame having a color pattern may be configured to determine the frame number of the frame based on the colors present within one or more particular regions of the frame. For example, by counting pixels, predefined locations within the frame may be associated with the frame's number. The equipment may be configured to use these colors to determine the frame number. As such, based on the color pattern, the frame number can be determined without use of an OCR process.

In some color patterns, four colors may be used: black (or the absence of color), red, blue, and green. This may be useful when the color pattern is being output in the form of an RGB (Red, Green, Blue) triplet. Typically, a television (or some other form of display) relies on lighting red, blue, and green pixels to display all colors. As such, it may be relatively non-intensive for a processor to determine, based on an RGB triplet signal, whether red, blue, green, or black is being displayed in a particular location of a frame. For example, if the brightest, saturated red is to be displayed in a particular pixel, the value of "R" would be at a maximum, while "G" and "B" would be at a minimum.

As an example of when a frame number may need to be identified, consider a testing arrangement. A video decoder, such as a set top box for a television, may need to be tested, such as during and/or following manufacturing, to ensure that it decodes video signals properly. To do this, a series of video frames may be decoded by the set top box and output to test equipment. Each of the decoded video frames may be compared to a corresponding reference frame. To determine the proper reference frame that each decoded video frame is compared to, each of the frames input to the set top box and the reference frames may be numbered.

In order to determine the frame number of the decoded video frame, a color pattern present on the decoded video frame may be analyzed. Based upon colors present in predefined locations within the color pattern, a frame number of the video frame may be determined. Using such a color pattern may permit the frame numbers of video frames to be quickly determined, such as in real time. In some embodiments, video frames may be received at 30 frames per second. Thus, 30 times per second frame numbers may be determined using color patterns present on each frame. This process may be performed without the use of an OCR process. Not using any OCR process may result in less demanding processing required to be performed by the test equipment.

Figure 2:
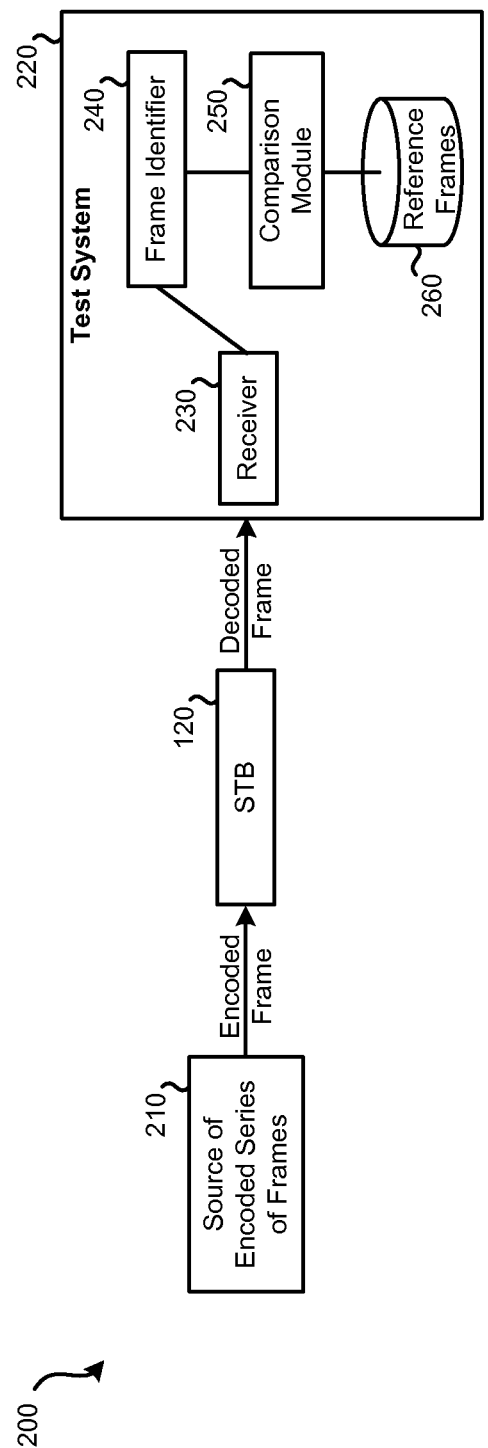
FIG. 2 illustrates an embodiment of a system for testing video signal decoding functionality of a set top box.

Identifying a frame number may be desired in a testing arrangement and/or a variety of other situations. FIG. 2 illustrates an embodiment of a system 200 for testing signal decoding functionality of a set top box. As such, the arrangement of system 200 may be used to determine whether set top box 120 properly decodes encoded frames. System 200 may be used in a manufacturing environment to test large quantities of set top boxes. System 200 may include source of encoded series of frames 210, set top box 120, and test system 220. Test system 220 may include: receiver 230, frame identifier 240, comparison module 250 and reference frames 260.

Source of encoded series of frames 210 may represent a video source that transmits a series of video frames encoded in an encoded format, such as MPEG. This encoded format may represent the format in which set top box 120 receives signals during typical operation. Some or all frames of encoded series of frames 210 may contain a color pattern that is used by test system 220 to determine the frame number. The encoded series of frames transmitted by source of encoded series of frames 210 may be transmitted as a loop. After the end of the loop of encoded frames is transmitted, the beginning of the series of frames may be transmitted again, thus resulting in a continuous loop being output by source of encoded series of frames 210. The series of encoded frames output by source of encoded series of frames 210 may have been previously created by modifying a series of frames in accordance with method 500 of FIG. 5.

Each encoded frame output by source of encoded series of frames 210 may be received as an input by set top box 120. Set top box (STB) 120 represents an STB being tested for video decoding functionality. STB 120 may represent a television set top box or various other types of video decoding devices. As such, STB 120 may receive encoded frames (such as in MPEG format) and may output decoded frames. STB 120 may have one or more processes being executed by a processor that decodes received encoded frames into a decoded format. The output decoded frames may be decoded to a format suitable for display on the television or other display device. In a testing arrangement, such decoded frames may be output to and received by test system 220. A color pattern present in each encoded frame may remain present in each corresponding decoded frame. While system 200 is illustrated as testing STB 120, it should be understood that other video decoding devices may be tested using a similar system. For example, a video decoding device present in a television may be tested using a similar arrangement of inputting encoded frames and testing the output of decoded frames.

Test system 220 may receive each decoded frame from STB 120. Some or all of these decoded frames may be analyzed to determine if STB 120 properly decoded the encoded frames. Receiver 230 may receive the decoded frames from STB 120. To determine if each of these frames was decoded properly, each frame may be compared to a corresponding reference frame. The color pattern present on each decoded frame (assuming STB 120 decoded each frame substantially well enough that the color pattern is present) may be used by frame identifier 240 of test system 220 to identify the frame number. Using the frame number, a corresponding reference frame may be retrieved from a database of reference frames 260 or some other form of data store that contains the reference frames. Such reference frames may be stored remotely or locally (as illustrated) in relation to test system 220. The encoded series of frames may be based on reference frames 260. Comparison module 250 may perform a comparison based on the decoded frame and the corresponding reference frame that was selected based on the color pattern present within the decoded frame.

Therefore, referring to system 200, a first encoded frame is transmitted to STB 120. STB 120 may decode this frame into a decoded format appropriate for output to a television or other form of display device. In a testing arrangement, this decoded frame may be received by receiver 230 of test system 220. Frame identifier 240 may identify the frame number of the received decoded frame based on a color pattern present within the decoded frame. A reference frame that corresponds to the frame number identified by the color pattern may be accessed and compared to the decoded frame by comparison module 250. If STB 120 properly decoded the frame, the decoded frame and the corresponding reference frame should appear identical or at least very similar (for instance, slight differences may occur due to the decoding process and noise). Test system 220 may not use optical character recognition (OCR) to identify the frame number of the decoded frame. Rather, the color pattern may be used to determine a frame number without OCR being necessary.

Test system 220 may be at least partially implemented using a computer system. As such, various components of test system 220 may be performed by a computer system, such as computer system 900 of FIG. 9. Similarly, a computer system may serve as source of encoded series of frames 210. In some embodiments, the same computer system may serve as test system 220 and source of encoded series of frames 210.

While the above example discusses a single frame being decoded by STB 120, it should be understood that the testing procedure may involve many video frames. For example, a testing procedure may involve 30 frames per second being decoded by set top box 120 for multiple seconds (e.g., 120 frames over the course of 4 seconds). Using the color pattern present on each frame (or at least some frames), the frame number of the decoded frames may be determined in real time for comparison to corresponding reference frames. To clarify, real time is used to refer to operation within a strict time constraint such that identification of the frame number occurs substantially at the same time the decoded frame is received by test system 220. For instance, real time may be used to refer to a situation where the frame number of the decoded frame is identified within 30 ms to 100 ms. In some embodiments, it may be possible to identify the frame number in less than 30 ms.

System 200 uses a color pattern to identify a frame number during the testing of STB 120. It should be understood that this is one possible application of using such a color pattern to identify a frame number. Other situations may exist where identifying a frame number using a color pattern may be useful. Such other situations may also involve the frame number being identified substantially in real time.

Figure 3:
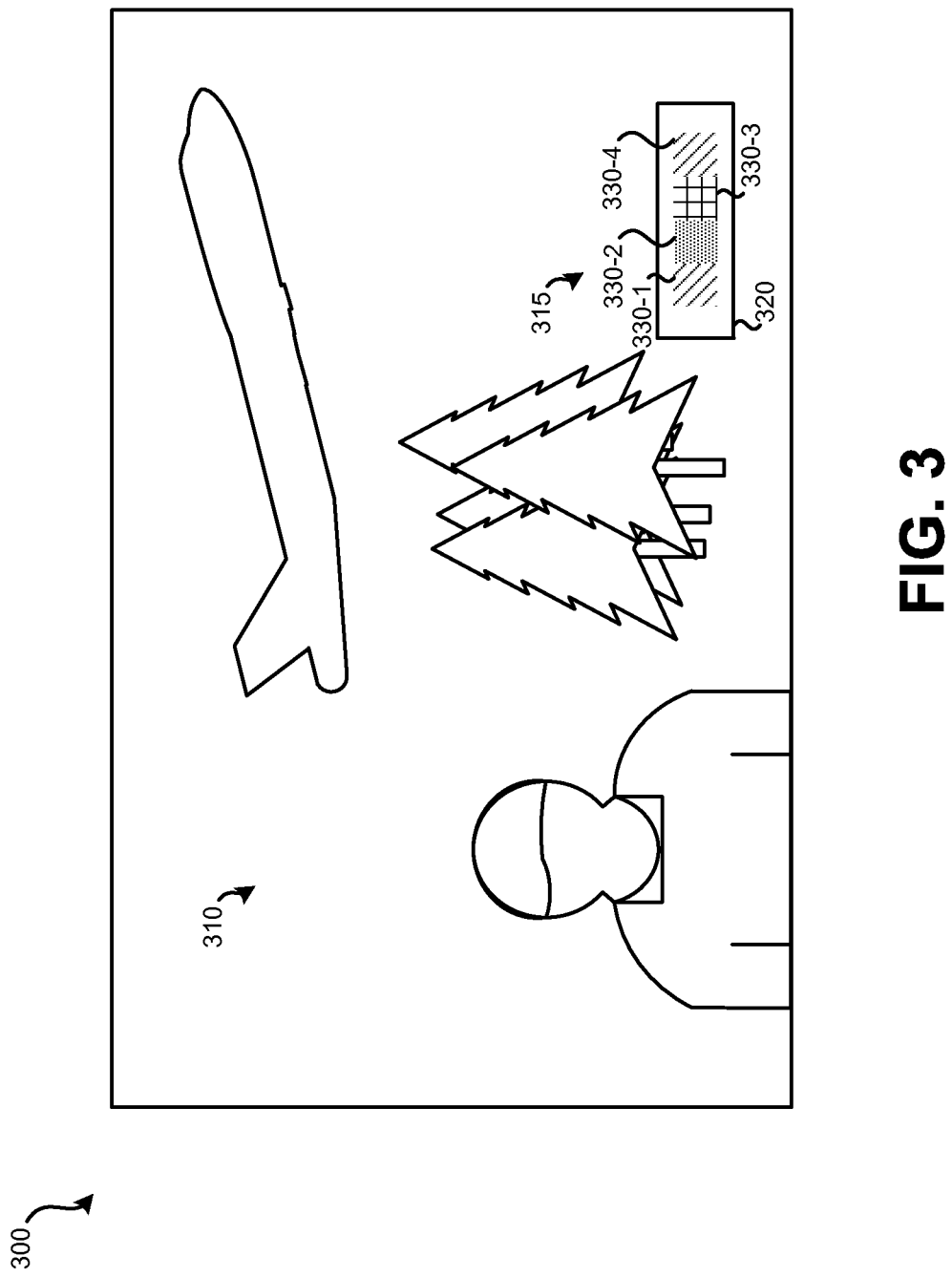
FIG. 3 illustrates an embodiment of a video frame that contains a color pattern that identifies a frame number of the video frame.

FIG. 3 illustrates an embodiment of a video frame 300 that contains a color pattern that identifies a frame number of the video frame. Image 310 illustrates the content of the video frame. In this example, the image comprises a person, trees, and an airplane. Present on video frame 300 is color pattern 315. Color pattern 315 may be located in a predefined location within video frame 300. This predefined location may remain constant for other video frames such that color patterns are present in the same location in multiple video frames. The predefined location may be selected by a user that encoded the series of video frames with color patterns, and may be anywhere within video frame 300. The computer device, such as test system 220 of system 200, may be configured with the location of color pattern 315.

Color pattern 315 may include multiple regions, wherein each region corresponds to a numerical value. Color pattern 315 has four such regions: 330-1, 330-2, 330-3, and 330-4. Each of these regions may be a particular color that corresponds to the frame number of video frame 300. Each color may be defined to correspond to a particular numerical value. For example, signals output to a display may be in the form of RGB triplets. As such, data within the signal for each pixel has a red component, a green component, and a blue component. To reduce the number of potential errors, colors may be used for the color pattern that are easily decipherable from each other. For instance, color pattern 315 may use red, blue, green, and black. For each of these colors a numerical value may be assigned, such as in Table 1.

TABLE 1

| Color | Numerical Value | RGB Triplet |
|---|---|---|
| Black | 0 | #000000 |
| Red | 1 | #FF0000 |
| Green | 2 | #00FF00 |
| Blue | 3 | #0000FF |

The RGB triplets used in Table 1 may be easily differentiated from each other. For each color, at most one color component is fully saturated, while the other color components have no saturation. This may help reduce the number of errors in determining a color. This color encoding method results in a very low likelihood of a color identification error. For an interpretation error to occur, such as for a red region to be interpreted as a green region, red may need to be improperly interpreted as at a minimum while green would need to be improperly interpreted at a maximum. If a blend of the two colors is detected (referring to the previous example, such as red and/or green each not at a maximum and minimum, respectively), an error handling procedure may be employed.

For the purpose of the black and white drawing of FIG. 3, patterns have been used to represent different colors. For example, the stripes of region 330-1 and 330-4 may represent red, the grid of region 330-3 may represent blue and the dots of region 330-2 may represent black. Buffer region 320 may represent a buffer region that separates regions 330 from image 310. Buffer region 320 may be black. As such, each region 330 may be surrounded on at least two sides by buffer region 320.

Since color pattern 315 corresponds to a particular frame number, each other frame in the series of frames that contains video frame 300 may have a different color pattern. These different color patterns may be located in the same or substantially the same location in other video frames. Therefore, if a series of video frames were displayed at 30 frames per second, the colors of color pattern 315 may change 30 times in a second. The number of regions 330 used may vary depending on: 1) the number of frames in the series of frames; and 2) the number of colors assigned to numerical values for use in color pattern 315. It should be understood that the use of four color regions 330 is for example purposes only; greater or fewer numbers of color regions may be used.

In some embodiments, it may be possible for each region of regions 330 to be smaller or larger in size. For example, each of regions 330 may be one pixel in size. However, having each region be larger on video frame 300 may decrease the possibility that an incorrect pixel is read as part of color pattern 315. Referring to FIG. 2, STB 120 (if functioning properly) under test may decode an encoded frame slightly differently than another STB. This difference, which may result in a shift of a small number of pixels or some other minor difference in display (e.g., a color varying slightly), may be less likely to adversely affect multiple-pixel regions. For example, the dimensions of each region may be 15 pixels by 15 pixels for each region in standard definition video. In high definition video, which has a greater number of pixels per square inch, a greater number of pixels may be used for each region, such as 30 pixels by 30 pixels. Such dimensions are intended to only be exemplary.

Figure 4:
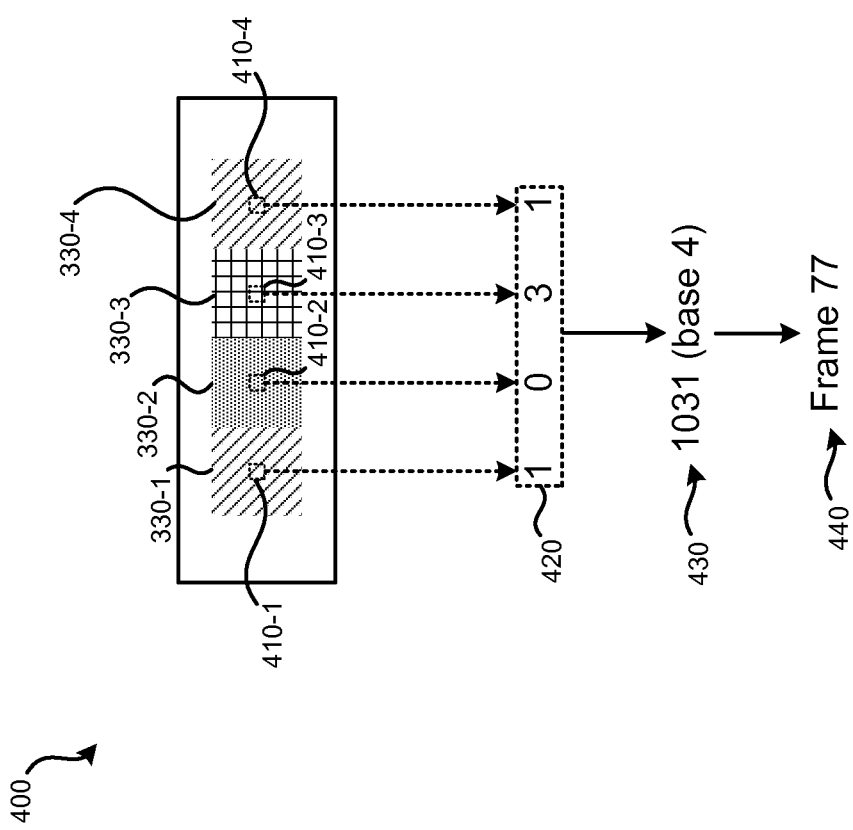
FIG. 4 illustrates an embodiment of how a color pattern translates to the frame number of a video frame.

FIG. 4 illustrates an embodiment of how a color pattern 400 may be used by a computerized device, such as test system 220 of FIG. 2, to determine the frame number of a video frame. Color pattern 400 may represent color pattern 315 of FIG. 3. A computerized device, such as test system 220, may be configured to identify a color at one or more predefined locations that correspond to regions 330 of color pattern 400. For example, a computerized device may be configured to identify numbers corresponding to four colored regions, wherein coordinates, such as in pixels, are provided for each region. A computerized device may be configured to determine a color of a pixel that is expected to be positioned at least approximately in the middle of a region of regions 330. Referring to region 330-1, a computerized device may be configured with the coordinates of pixel 410-1 to identify the color of region 330-1 in general. In some embodiments, rather than using a single pixel, multiple pixels expected to be within a particular color region may be analyzed. The value of each of these pixels may be averaged or otherwise used to determine a color of the region of regions 330.

In the illustrated embodiment of FIG. 4, coordinates of pixels 410 (410-1, 410-2, 410-3, and 410-4) expected to be located within a color region are used to determine the colors of color pattern 400. Therefore, for color pattern 400, a computerized device may have four coordinates that are analyzed for color. Each of these colors may be linked with a particular numerical value, such as in Table 1. As such, the color pattern may be interpreted as 1031, indicated at callout 420. Callout 430, constructed from the individual identified numbers of callout 420, may be in base four because only four colors are used (red, blue, green, and black). As such, each region of regions 330 may have four possible values. Therefore, callout 440 refers to the number of callout 430 converted to base ten, having a numerical value of 77. Therefore, a video frame containing color pattern 400 may be frame 77 of a series of video frames.

Figure 5:
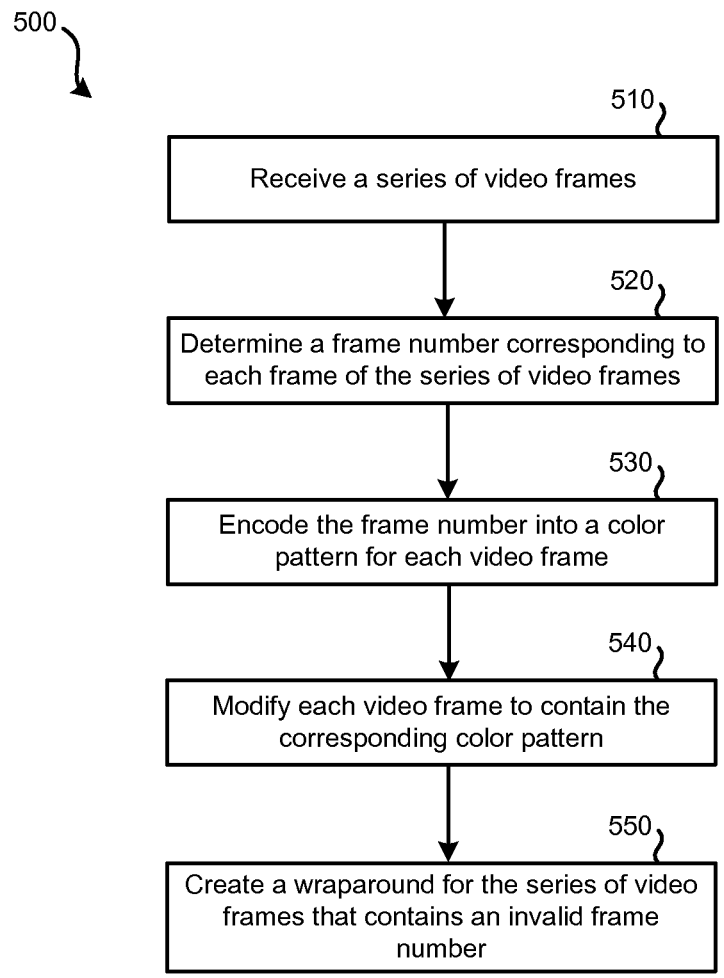
FIG. 5 illustrates an embodiment of a method for creating a series of video frames encoded with color patterns that identify frame numbers.

FIG. 5 illustrates an embodiment of a method 500 for creating a series of video frames encoded with a color pattern that identifies a frame number for each video frame. Each step of method 500 may be performed by a computer system or some other form of computerized device. Method 500 may be performed by test system 220 (which may be a form of computer system and/or computerized device). Means for performing each step of method 500 may include a computer system, computerized device, or some other video-editing device.

At step 510, a sequence of video frames may be received. Some or all of the video frames may be desired to be labeled using color patterns to identify frame numbers of the frames. The video frames received at step 510 may not have a visual indication of a frame number present or may have a numeral (or other type of character) displayed that indicates the frame number.

At step 520, a frame number for each frame of the series of video frames received at step 510 may be determined. This may be accomplished by counting the frames received at step 510. For example, a first frame (the frame that is to be displayed first) of the series of video frames may be identified as frame 1, the second video frame as frame 2, etc. It should be understood that various numbering schemes may be used. For example, frame numbers may count down (rather than up). A user may provide an indication of the desired numbering scheme.

At step 530, the frame number for each frame may be encoded into a color pattern. The number of colored regions to use for the color pattern and/or the number of colors present in the palate to be used for the color pattern may be predefined. In some embodiments, a user may specify either the number of available colors and/or the desired maximum number of color regions, and the other value may be selected for the user. In some embodiments, a standard palate of colors is used (e.g., four) and a standard number of color regions is used (e.g., five). The location of where the color pattern occurs on each video frame may be user-defined or may be standardized. Using a defined relationship between colors and numbers, such as Table 1, each frame number may be encoded into a color pattern.

At step 540, each of the video frames may be modified to include the color pattern corresponding to the video frame. For example, video frame 27 of the series of video frames received at step 510 may be modified to have a color pattern that indicates the number 27. The location at which the color pattern is positioned may be consistent for all of the video frames in the series of video frames.

At step 550, if the series of video frames is intended to be played as a loop, a wraparound for the series of video frames may be created. Frames of the wraparound may not be desired to be assigned valid frame numbers. As such, the wraparound may not indicate valid frame numbers. For instance, the color pattern of the wraparound may not indicate a frame number or may indicate an invalid frame number (such as zero).

The described embodiment of method 500 is detailed in relation to each step being performed for every frame in sequence. It should be understood that in some embodiments, multiple steps may be performed for a particular frame, with at least portions of the method repeated for other frames. For example, steps 510 through 540 may be performed for a particular frame and then repeated for another frame. Since method 500 may only need to be performed a relatively small amount of times to create an encoded sequence of video frames (in comparison to the number of times reading of the frame numbers may occur), method 500 may not be performed in real time.

Figure 6:
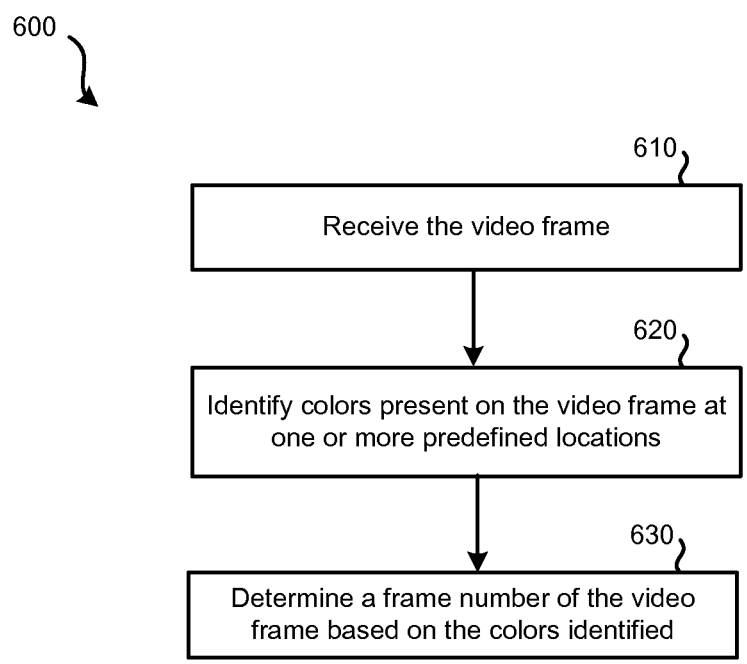
FIG. 6 illustrates an embodiment of a method for determining a frame number of a video frame.

FIG. 6 illustrates an embodiment of a method 600 for determining a frame number for a video frame. Each step of method 600 may be performed by a computer system or some other form of computerized device. Method 600 may be performed by test system 220 (which may be a form of computer system and/or computerized device). Means for performing each step of method 600 may include a computer system, test system 220, or some other form of computerized device.

At step 610, a video frame may be received. This video frame may have been decoded from a first format into a second format by an external device, such as a set top box that is under test. The video frame may contain a color pattern that indicates a frame number. The color pattern may have been added to the video frame using a method such as method 500 of FIG. 5.

At step 620, colors present on the video frame received at step 610 may be identified at one or more locations. The one or more locations, which may be identified as coordinates in pixels, may correspond to different colored regions of a color pattern. These locations may be predefined to correspond to the color regions of a color pattern. For instance, if the same computer system or computerized device was used to add the color pattern to the video frame, the system may already have an indication of the location of the color pattern and/or regions of the color pattern stored. In some embodiments, the location of the color pattern and the regions of the color pattern are standardized, such that standard coordinates may be used to identify the appropriate regions to be used to determine the frame number. In some embodiments, for a first frame, a user may identify the location of various regions within a color pattern. Coordinates of these identified regions may then be used for subsequently received frames.

Based on the colors identified at step 620 in conjunction with stored data that indicates a numerical value that corresponds to each color, such as in Table 1, a frame number may be determined at step 630. Numerical values determined for each colored region may be combined to create a single number, such as illustrated in callouts 420 and 430 of FIG. 4. In some embodiments, the determined frame number is converted from one base (such as base 4) to another base (such as base 10).

Method 600 may be performed without an OCR process being necessary. Further, method 600 may be performed in real time, meaning the frame number is determined shortly after receiving the video frame. In some embodiments, this may mean that it takes less than two milliseconds for the frame number to be determined after receiving the video frame.

Figure 7:
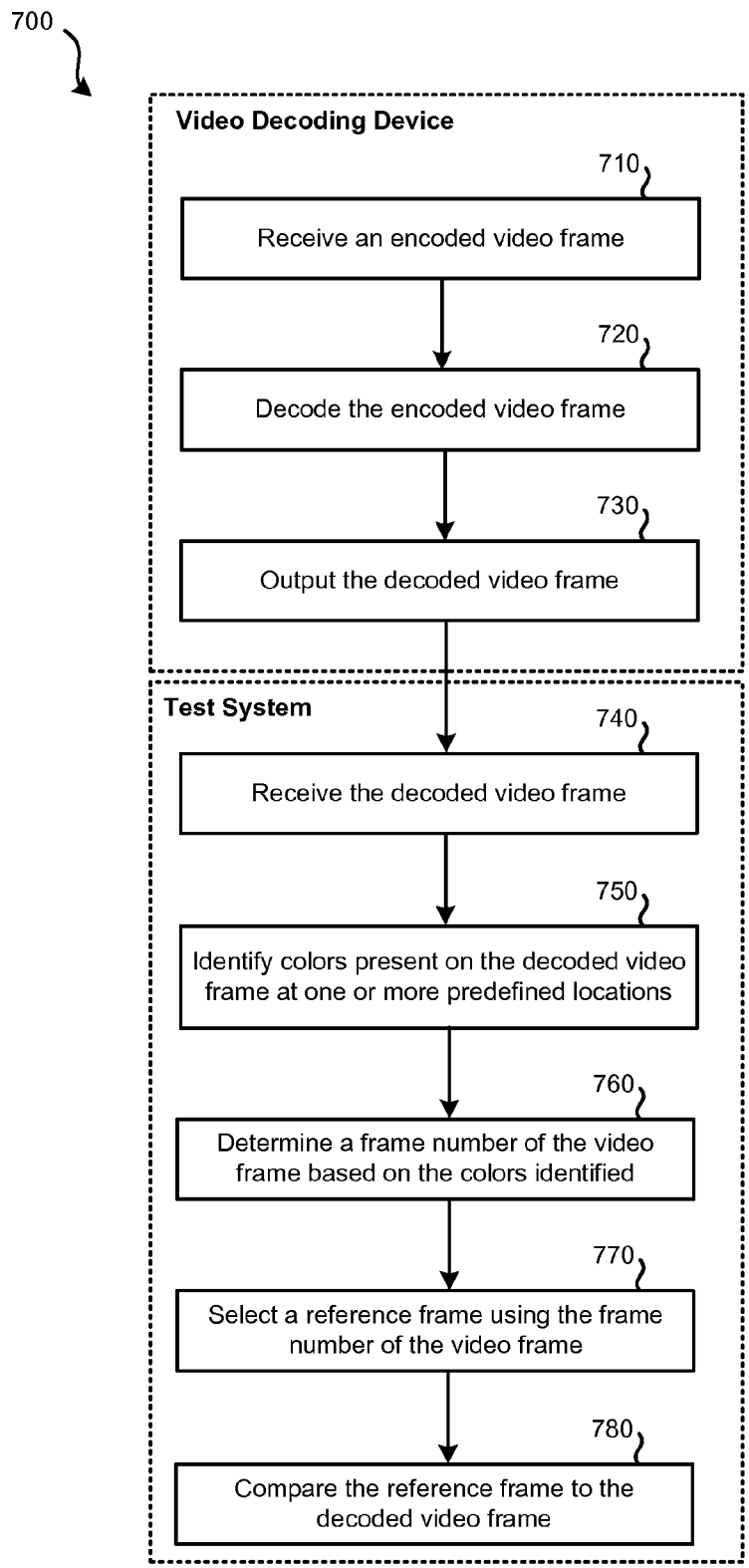
FIG. 7 illustrates an embodiment of a method for determining a frame number of a video frame in an arrangement for testing a video decoding device.

FIG. 7 illustrates an embodiment of a method 700 for determining a frame number for a video frame in an arrangement for testing a video decoding device. Each step of method 700 may be performed by a video decoding device such as a set top box, a test system, a computer system, or some other form of computerized device. Steps of method 700 may be performed, as illustrated, by a video decoding device (e.g., set top box, television tuner) and a test system. Referring to FIG. 2, steps 710 through 730 may be performed by STB 120 and steps 740 through 780 may be performed by test system 220. Means for performing each step of method 700 may include a set top box, a computer system, a test system 220, and/or some other form of computerized device.

At step 710, an encoded video frame may be received by a set top box. The encoded video frame may be in an MPEG format or some other format appropriate for transmission to a video decoding device, such as a set top box. Referring to FIG. 2, set top box 120 may receive an encoded frame from source of encoded series of frames 210.

At step 720, the video decoding device may decode the received, encoded video frame from a first format (e.g., MPEG) to a second format (referred to as the decoded format). The second format may be appropriate for output to a television or some other form of display device. A goal of method 700 may be to test this decoding function of the video decoding device.

At step 730, the decoded video frame may be output. As such the encoded video frame received at step 710 is output in a different format at step 730. The decoded video frame should at least approximately contain the same video information as the encoded video frame. As such, a color pattern present in the encoded video frame should appear similarly or identically in the decoded video frame.

At step 740, the decoded video frame may be received by the test system from the video decoding device. Referring to FIG. 2, test system 220 may receive a decoded frame from set top box 120.

At step 750, the colors present on the video frame received at step 740 by the test system may be identified at one or more locations. The one or more locations, which may be identified as coordinates in pixels, may correspond to different regions of a color pattern present within the decoded frame. For instance, if the same computer system or computerized device was used to add the color pattern to the video frame, the system may already have an indication of the location of the color pattern and/or regions of the color pattern stored. In some embodiments, the location of the color pattern and the regions of the color pattern are standardized, such that standard coordinates may be used to identify the appropriate regions to be used to determine the frame number. In some embodiments, a user may identify the location of the various colored regions within a color pattern.

Based on the colors identified at step 750 in conjunction with stored data that indicates a numerical value that corresponds to each color, such as in Table 1, a frame number may be determined at step 760. In some embodiments, the determined frame number is converted from one base (such as base 4) to another base (such as base 10). In some embodiments, a user provides a numerical value to use for each color used in the color patterns.

At step 770, a reference frame may be selected using the frame number determined at step 760. The reference frame may correspond to the frame number. As such, the decoded video frame may ideally contain the same image as present in the corresponding reference frame. The frame number determined at step 760 may be used to select the corresponding reference frame from a set of reference frames. At step 780, the decoded frame may be compared to the reference frame that corresponds to the determined frame number of the decoded frame.

Method 700 may be performed at least substantially in real time without an OCR process being necessary. For instance, color patterns for 30 frames may be identified every second without the use of an OCR process.

Figure 8:
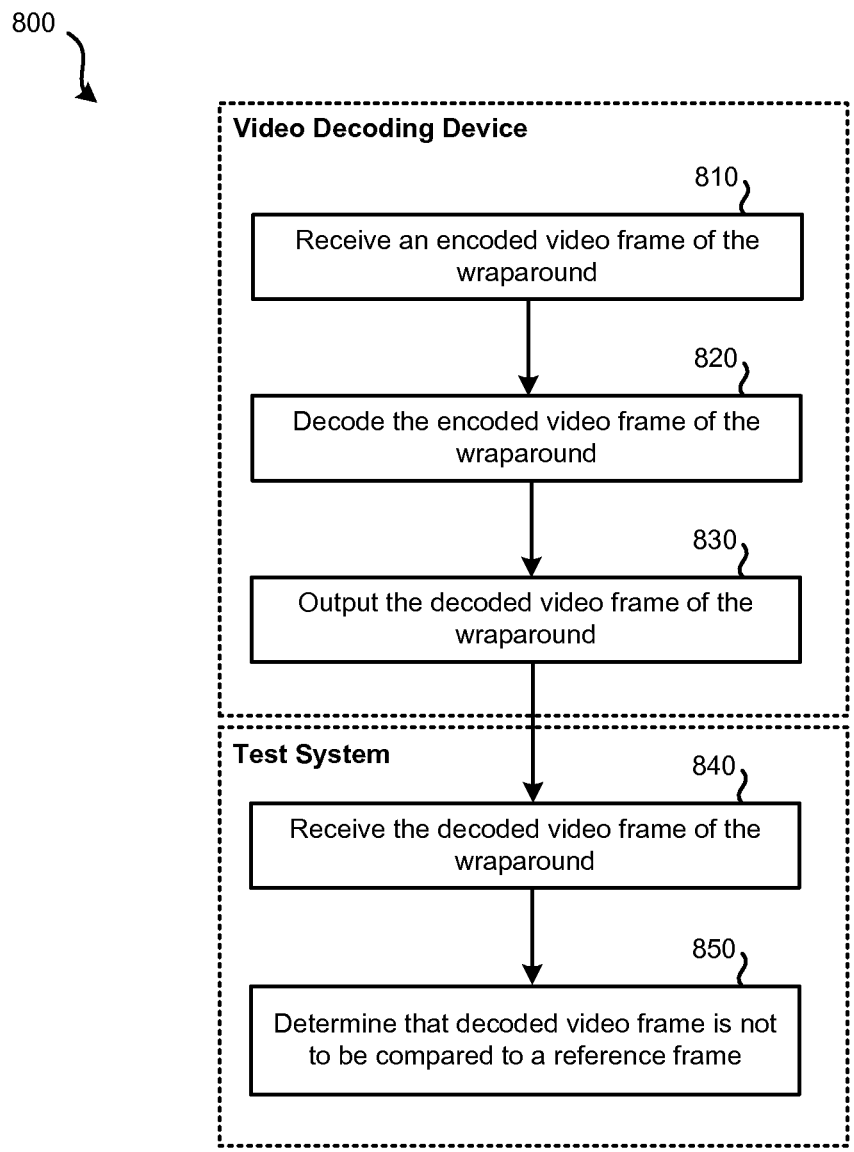
FIG. 8 illustrates an embodiment of a method for not using particular video frames for testing a video decoding device.

FIG. 8 illustrates an embodiment of a method 800 for not using particular video frames for testing a video decoding device. In some embodiments, a series of video frames is used as a loop for testing video decoding devices. When the series of video frames transitions from the last frame to the first frame, one or more frames, which may be part of a wraparound, may not be desired to be used for a comparison. Each step of method 800 may be performed by a set top box, test system, computer system, or some other form of computerized device. Steps of method 800 may be performed, as illustrated, by a video decoding device (e.g., set top box, television tuner) and a test system. Referring to FIG. 2, steps 810 through 830 may be performed by STB 120 and steps 840 and 850 may be performed by test system 220. Means for performing each step of method 800 may include a set top box, a computer system, a test system 220, and/or some other form of computerized device.

At step 810, an encoded video frame of the wraparound may be received by a set top box. The encoded video frame may be in an MPEG format or some other format appropriate for transmission to a video decoding device, such as a set top box. Referring to FIG. 2, set top box 120 may receive an encoded frame from source of encoded series of frames 210.

At step 820, the video decoding device may decode the video frame from a first format (e.g., MPEG) to a second format (referred to as the decoded format). The second format may be appropriate for output to a television or some other form of display device. The decoded video frame may contain a color pattern that either does not identify a frame number, identifies an invalid frame number, or identifies a frame number that serves as a flag not to perform a comparison of the decoded frame with a reference frame.

At step 830, the decoded video frame may be output. As such, the encoded video frame of the wraparound received at step 810 is output in a different format at step 830. The decoded video frame should at least approximately contain the same video information as the encoded video frame. As such, a color pattern present in the encoded video frame should appear similarly or identically in the decoded video frame.

At step 840, the decoded video frame of the wraparound may be received from the video decoding device by the test system. At step 850, based on the color pattern of the decoded video frame, the test system may determine that the decoded video frame is not to be compared to a reference frame. For example, this may occur based on no color pattern being present, an invalid frame number being identified by the color pattern, or a frame number that serves as an instruction to not perform a comparison (such as frame zero). In some embodiments, the test system may maintain a listing (or other data structure) that indicates frames, by number, that are not to be compared to reference frames. In some embodiments, if a frame number does not correspond to a frame number of a stored reference frame, it is assumed no comparison should be conducted. If a color pattern is present, a method such as method 600 may be performed to determine the frame number. Based upon no color pattern being present, an invalid frame number being identified by the color pattern, or a frame number that serves as an instruction to not perform a comparison, no comparison is performed between the decoded video frame which is part of the wraparound and a reference frame.

Method 800 may be performed at least substantially in real time without an OCR process being necessary. For instance, color patterns for 30 frames may be identified every second without the use of an OCR process, and at least some of these frames may be wraparound frames.

Figure 9:
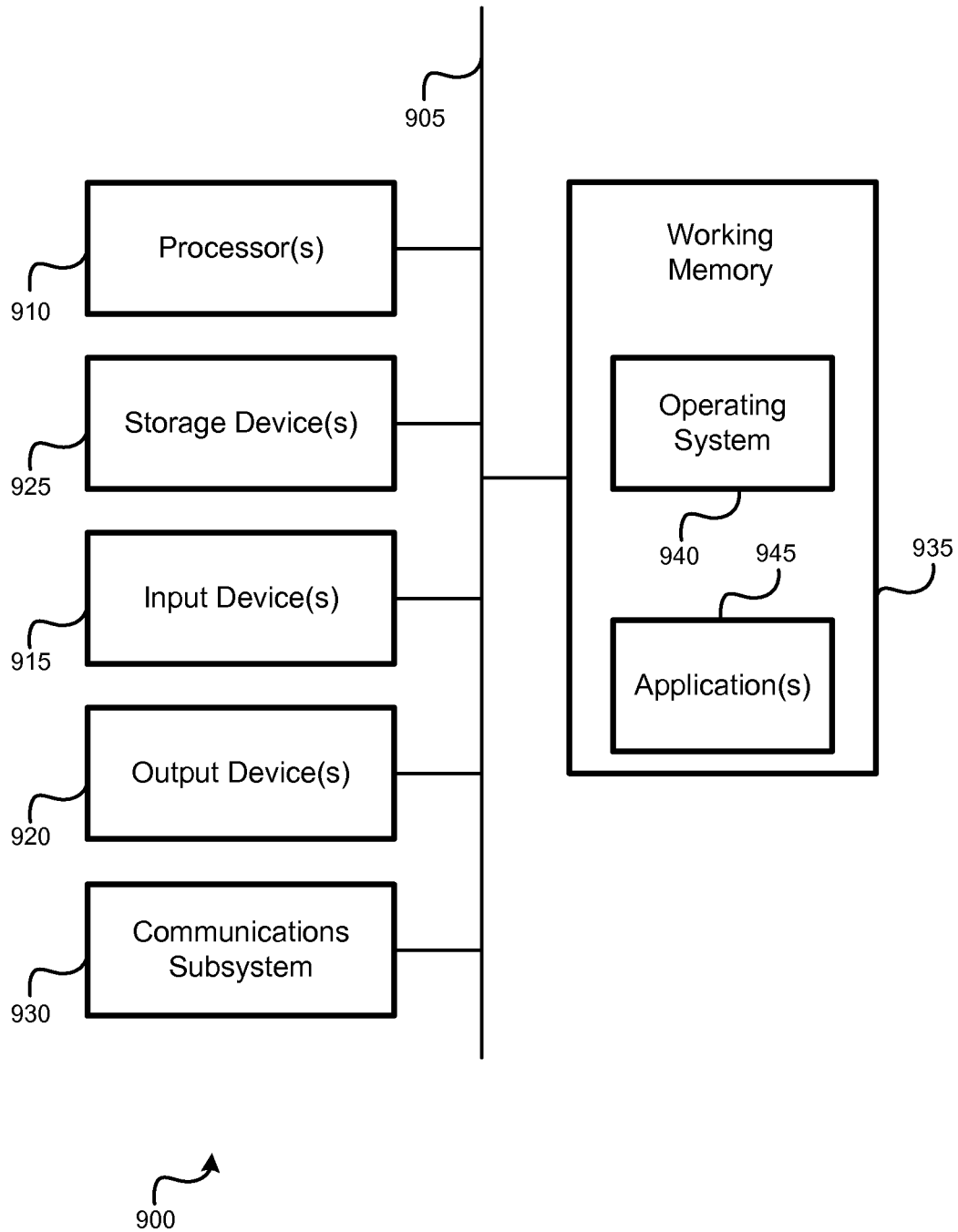
FIG. 9 illustrates an embodiment of a computer system.

FIG. 9 illustrates an embodiment of a computer system. A computer system as illustrated in FIG. 9 may be incorporated as part of the previously described computerized devices, such as a set top box, a test system, and/or a source of encoded series of frames. FIG. 9 provides a schematic illustration of one embodiment of a computer system 900 that can perform the methods as described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for determining a frame number of a video frame, the method comprising:
receiving, by a video decoding device, an encoded video frame of a series of video frames;
decoding, by the video decoding device, the encoded video frame of the series of video frames;

outputting, by the video decoding device to a computer system, the decoded video frame of the series of video frames wherein:
  the decoded video frame comprises a test image and a color pattern; and
  the computer system is separate and communicatively coupled with the video decoding device;
identifying, by the computer system, a first color present within the color pattern of the video frame at a first predefined location, wherein identifying the first color includes determining, at most one color of an RGB triplet of the first predefined location as being fully saturated and determining each other color of the RGB triplet of the first predefined location as having no saturation;
identifying, by the computer system, a second color present within the color pattern of the video frame at a second predefined location, wherein identifying the second color includes determining, at most one color of an RGB triplet of the second predefined location as being fully saturated and determining each other color of the RGB triplet of the second predefined location as having no saturation; and
determining, by the computer system, the frame number of the video frame using at least the first color and the second color.

2. The method for determining the frame number of the video frame of claim 1, wherein each color of the color pattern corresponds to a different number.

3. The method for determining the frame number of the video frame of claim 2, wherein optical character recognition is not used by the computer system to determine the frame number.

4. The method for determining the frame number of the video frame of claim 3, the method further comprising:
  selecting, by the computer system, a reference frame that corresponds to the frame number of the decoded video frame, wherein the reference frame comprises the test image; and
  comparing, by the computer system, the reference frame and the decoded video frame.

5. The method for determining the frame number of the video frame of claim 1, further comprising:
  receiving, by the video decoding device, a second encoded video frame;
  decoding, by the video decoding device, the second encoded video frame, wherein the second encoded video frame is part of a wraparound that transitions an end of the series of video frames to the beginning of the series of video frames;
  outputting, by the video decoding device to the computer system, the second decoded video frame wherein a second color pattern of the second decoded video frame prevents determination of a valid frame number; and
  determining, by the computer system, the second decoded video frame is not to be compared to another video frame based on the second color pattern.

6. The method for determining the frame number of the video frame of claim 1, wherein:
  each predefined location corresponds to a different region of the color pattern; and
  each region of the color pattern comprises multiple pixels of the video frame.

7. The method for determining the frame number of the video frame of claim 1, wherein determining, by the computer system, the frame number of the video frame using the first color and the second color is performed in real time.

8. The method for determining the frame number of the video frame of claim 1, further comprising:
  receiving, by the computer system, from a user, the first and the second predefined locations.

9. A computer program product residing on a non-transitory processor-readable medium for determining a frame number of a video frame, the computer program product comprising processor-readable instructions configured to cause a processor to:
  identify a first color present within a color pattern of the video frame at a first predefined location, wherein identifying the first color includes determining, at most one color of an RGB triplet of the first predefined location as being fully saturated and determining each other color of the RGB triplet of the first predefined location as having no saturation;
  identify a second color present within the color pattern of the video frame at a second predefined location, wherein identifying the second color includes determining, at most one color of an RGB triplet of the second predefined location as being fully saturated and determining each other color of the RGB triplet of the second predefined location as having no saturation; and
  determine the frame number of the video frame using at least the first color and the second color.

10. The computer program product for determining the frame number of the video frame of claim 9, wherein each color of the color pattern corresponds to a different number.

11. The computer program product for determining the frame number of the video frame of claim 9, wherein optical character recognition is not used to determine the frame number.

12. The computer program product for determining the frame number of the video frame of claim 9, the processor-readable instructions being further configured to cause the processor to:
  select a reference frame that corresponds to the frame number of the video frame; and
  compare the reference frame and the decoded video frame.

13. The computer program product for determining the frame number of the video frame of claim 9, wherein:
  each predefined location corresponds to a different region of the color pattern; and
  each region of the color pattern comprises multiple pixels of the video frame.

14. The computer program product for determining the frame number of the video frame of claim 9, wherein the processor-readable instructions configured to cause the processor to determine the frame number of the video frame using the first color and the second color are executed in real time.

15. A method for numbering video frames, the method comprising:
  receiving, by a computer system, a series of video frames;
  numbering, by the computer system, each frame of the series of video frames such that each frame is assigned a number;
  encoding, by the computer system, the number corresponding to each frame into a color pattern, wherein
    each color used for the color pattern corresponds to a numerical value; and
    each color includes at most one color value of an RGB triplet being fully saturated and each other color value of the RGB triplet having no saturation;
  modifying, by the computer system, each frame to comprise the color pattern corresponding to the number of the frame, wherein the position of the color pattern is consistent for each frame of the series of video frames.

16. The method for numbering the video frames of claim 15, wherein the color pattern is comprised of a series of colored regions, wherein each colored region comprises multiple pixels and each colored region contains only a single color.

17. The method for numbering the video frames of claim 16, wherein modifying, by the computer system, each frame to include the color pattern corresponding to the number of the frame further comprises modifying each frame to have a blank region surrounding the color pattern.

18. The method for numbering the video frames of claim 15, wherein:
  the series of video frames is part of a video loop used for testing video equipment; and
  the method further comprises:
    creating a wraparound from an end of the series of video frames to a beginning of the series of video frames, wherein at least one video frame of the wraparound is configured to prevent a comparison involving the at least one frame of the wraparound.

\* \* \* \* \*